Nov. 22, 1949 — O. SCHWIMMER — 2,489,163
COMPENSATOR FOR AIRCRAFT CABLE CONTROLS
Filed Dec. 16, 1944
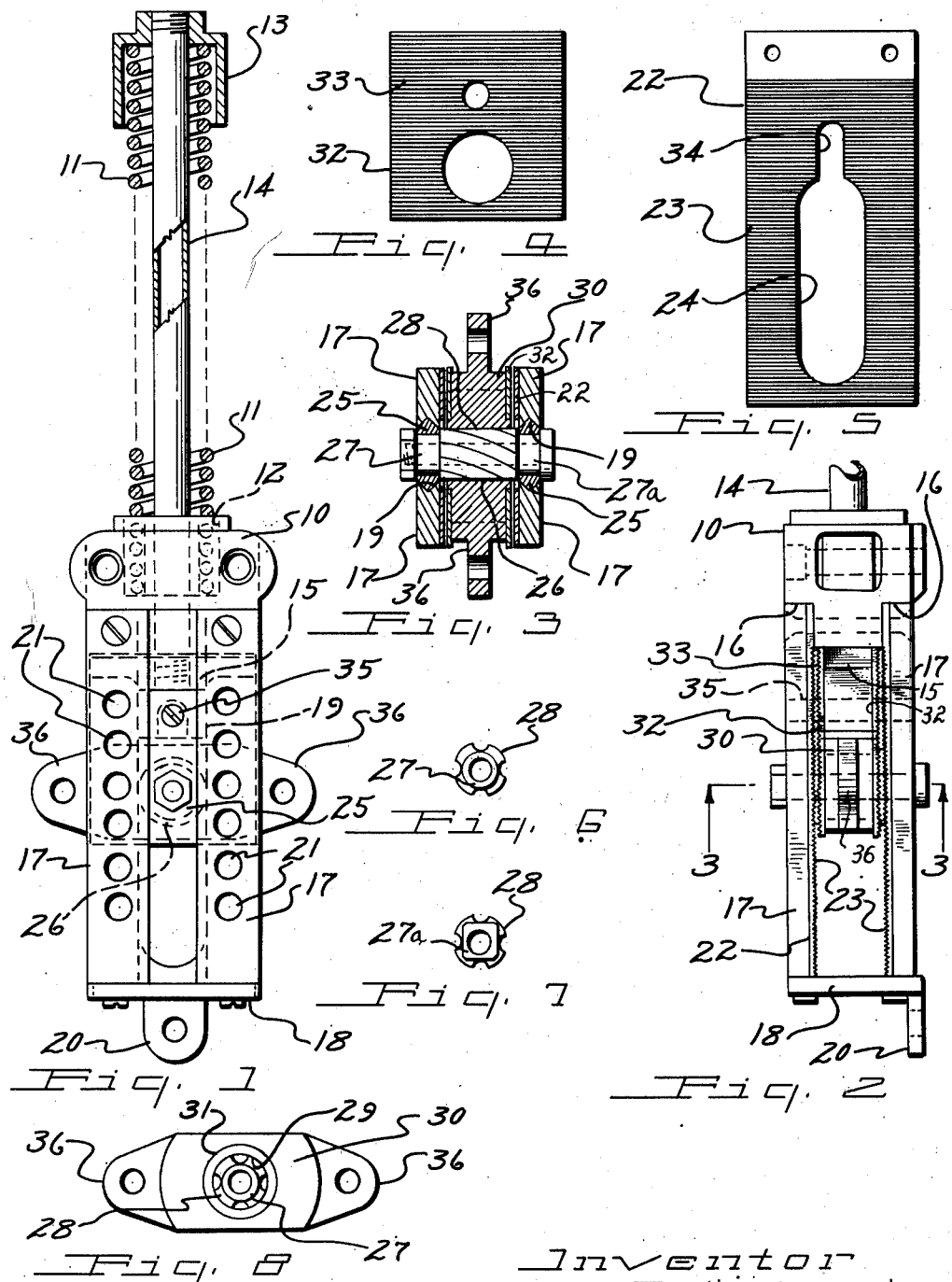
Inventor
Oscar Schwimmer
By Westall and Westall
Attys Patented Nov. 22, 1949

2,489,163

UNITED STATES PATENT OFFICE 2,489,163

COMPENSATOR FOR AIRCRAFT CABLE CONTROLS

Oscar Schwimmer, Los Angeles, Calif.

Application December 16, 1944, Serial No. 568,549

13 Claims. (Cl. 267—71)

This invention relates to tensioning devices for cables and the like, and pertains more specifically to spring-actuated apparatus having especial utility as a means for maintaining the normal rigged tension of control cables of aircraft, being adapted to compensate for variations in cable length or in distance between cable terminals, incident to temperature change, or stretch of the cables due to excessive whipping or the application of extreme working tensions to the cables at a time when manual readjustment is not practicable, e. g., while the aircraft is in flight.

It is common practice to utilize cables as part of the actuating mechanism of the directional apparatus of aircraft, i. e., rudder, ailerons, elevators, and the like. In order to assure immediate and effective response to the pilot's manipulation of the cockpit controls, it is essential that the tension of all such cables be critically preadjusted and maintained. Turnbuckles are normally employed in control cable assemblies for this purpose, and under ordinary circumstances may be relied upon as a convenient means for manually taking up slack due to elongation produced by normal work tensions.

However, cable tensions may be affected during flight as a consequence of changes in temperature which not only result in contraction and elongation of the cables themselves, but causes the entire metal fuselage to shrink or expand as well, and to a greater extent than the cables, producing a slack in the latter, which seriously impairs the sensitivity of the controls. To overcome this difficulty, a resilient element of sufficient strength to sustain extreme loads but normally only partially extended when the cables are adjusted to mean tensions are incorporated. However, the interposition of a spring in the control cable assembly, in the absence of auxiliary locking means, precludes positive and faithful transmission of control impulses, due to the tendency of the resilient element to absorb the load, as, for example, in aircraft when a sudden change in direction of flight at high speed is necessitated.

Accordingly, in the art prior to my invention, numerous spring compensators have been evolved to compensate for variations in cable length or terminal distance, incorporating means for momentarily locking the unit against further expansion and contraction when any sudden tension is applied to the control cables, as might result from an abrupt change in direction of flight. It will be appreciated, however, that great stress may be gradually laid upon one or the other of the dual cables of a control, as, for example, upon the elevators of an aircraft when pulling out of a power dive. In such case, there being no sudden application of tension upon the cable of the control assembly, the device remains as a resilient element in the cable assembly, absorbing the initial tensioning of the cables incident to manipulation of the cockpit controls, and preventing sensitive response of the ship.

It is a general object of the present invention to obviate the difficulties aforementioned by the provision of a compensator, embodying a resilient element having means for connection to each of a pair of cables, preadjusted to mean uniform tension and adapted to maintain the static load thus imposed under working conditions by compensating for variations in effective length of the cables resulting from temperature change, the resilient element being rendered instantaneously inoperative incident to the application of greater tension to one or the other of the cables, while maintaining the previous adjustment of the compensator.

More specifically, an object hereof is the provision of a device adapted for engagement with each of a pair of cables of the character commonly employed as a part of the actuating mechanism for aircraft flight control units, operable to maintain a uniform regulated tension on both cables when the flight control unit and its cockpit controls are in mean positions unaffected by external influences, in combination with means to positively lock the device against further compensatory adjustment, in response to any disparity between the tensions of the respective cables with which the device is utilized whether such variation in tension results from manipulation of the cockpit controls or from aerodynamic factors, ice or other influences acting directly upon the flight control unit with which the cables are connected.

Another object is to provide a balancing unit adapted to equalize tension upon each of a pair of cables, the tension being predetermined by a resilient element, and to maintain, substantially, that adjustment during the application of greater tension to one or the other of the cables as during a change in direction of flight.

Still another object is to provide a compensator of the character above alluded to which is entirely mechanical in operation, obviating the production of internal pressures common in hydraulic units, and, being unaffected by external temperatures or pressures, is capable of functioning with uniform efficiency at any elevation.

Another object is to provide a sensitive locking device in a compensator, having a resilient element tensioning the cables, operable to resist further flexing of the resilient element immediately upon any variation in tension externally applied to either of the cables, the effectiveness of the locking device being substantially independent of the extent of the difference in tension applied to the cables.

Other objects and corresponding advantages of my invention, such, for example, as simplicity of design, durability, facility of inspection and lubrication, ease of replacement of worn parts, and light-weight construction, will be apparent to those of skill in the art upon an examination of the following description, read in the light of the accompanying drawings, in which:

Fig. 1 is a view, principally in elevation, of one embodiment of my invention, with the parts thereof extended and the spring relatively relaxed;

Fig. 2 is an elevation of the lower part of the device, taken at right angles to the view of Fig. 1;

Fig. 3 is a sectional view on lines 3—3 of Fig. 2, depicting the helix by which the locking means is actuated;

Fig. 4 is an elevation of one of the two movable locking plates;

Fig. 5 is an elevation of one of the stationary locking plates carried by the frame in the assembly;

Fig. 6 is an elevation of one end of the helix forming a part of the locking means;

Fig. 7 is a view in elevation, showing the opposite end of the helix;

Fig. 8 is a side elevation of the yoke member.

Referring to the drawings in detail, the numerals of which indicate similar parts throughout the several views, 10 designates a flat head having holes through opposite sides for the extension of screws, bolts, or the like, by which the device may be secured to a suitable mounting adjacent the cables to be serviced. One end of a helical spring 11 is accommodated by an annular groove 12 in one side of the head, the walls of the groove serving to reinforce the spring against lateral displacement. Spring 11 is normally held under compression by a cup-shaped retainer 13 threaded on the end of a tubular tie rod 14. The rod extends through spring 11 and head 10, terminating in threaded engagement with a T-bar 15 held by the expansive urge of spring 11 against the head. Opposite sides of head 10 are cut away as at 16 for the attachment of the ends of four elongated gibs 17, two of which are secured to each side of the head in spaced relation by screws or other suitable means. Gibs 17 are firmly held in parallel rigid relationship by a base plate 18 to which the opposite end of each of gibs 17 is mounted. Opposed edges of each pair of gibs are formed with V-shaped guide grooves 19 for a purpose later referred to. 20 indicates a perforated lug integral with and projecting from one edge of base plate 18 for the extension of suitable means of attachment by which the unit may be mounted more firmly in its desired location. As lightweight construction is of prime importance in all aircraft equipment, gibs 17 may be provided, as illustrated, with a plurality of lightening holes 21.

Interposed between head 10 and each pair of gibs 17 is a locking plate 22 (Figs. 1 and 5). The inner surface of each plate is formed with a plurality of fine serrations 23 extending perpendicularly to the longitudinal axis of the device. Each plate 22 is formed with a slot 24 through which the locking and equalizing mechanism about to be described is adapted to reciprocate in response to variations in tension applied to the control cables with which the apparatus is associated.

A pair of rectangular slides 25, having their longitudinal edges formed to correspond with the V-shaped grooves 19 in gibs 17, are mounted between each pair of gibs, respectively, for reciprocation relative to head 10. A hollow lock-control shaft 26 is formed with reduced ends 27 and 27a, respectively, which extend through the slides. One end 27a of shaft 26 is square in cross section, and is received by a square opening in one of slides 25 so as to resist relative rotary motion between shaft 26 and slides 25. The intermediate portion of the shaft is formed with integral helical projections 28 which are received in correspondingly-shaped grooves 29 in the bore of a yoke member 30, whereby the complementary helices of shaft 26 and yoke 30 function to compel the latter to shift laterally in response to the slightest rotary motion imparted to the yoke. Hubs 31 projecting co-axially from opposite sides of yoke 30 provide mountings, respectively, for a pair of movable locking plates 32. Each of plates 32 is formed with a plurality of parallel serrations 33 forming teeth identical in size and spacing to those of plates 22, and with the teeth of which they are adapted to engage in operation. The yoke assembly is secured to T-bar 15 by a pin 35 projecting through one of slides 25 and, extending freely through narrow slot extensions 34 in the stationary plates 22, and through holes in movable plates 32 and T-bar 15, is threaded into the opposite slide.

Yoke 30 is formed with a pair of perforated ears 36 which project laterally to opposite sides of the compensator, to facilitate attachment of tensioning cables through which the compensatory adjustment is effected.

The operation of my invention as applied to the tensioning of aircraft cables is briefly described as follows: By preliminary tensioning, the yoke assembly is shifted to approximately the middle of its normal range of movement between head 10 and base plate 18. This shifting of yoke 30 is effective to draw the T-bar 15 from its rest position against head 10, thus partially compressing spring 11 by transmitting its motion to retainer 13 through the tie rod 14. Thereafter, any uniform expansion or contraction of the cables or fuselage resulting in a reduction or extension of the distance between the terminals of the cables, or in the lengths of the latter, in response to temperature change, is automatically compensated by the action of the spring 11 shifting the yoke assembly relative to the head, so as to either tighten or relieve the tension on the cables as required to maintain the rigged tension. It will be understood that with a uniform tension applied to the cables, the yoke member 30 is normally disposed intermediate the stationary locking plates 22, the movable plates 32 being loosely carried on hubs 31 of the yoke. Accordingly, there being no lateral pressure applied to either of the plates 32, the teeth of the latter are permitted to slide freely over the teeth of their complementary locking plates 22 without restricting the yoke in its movement in response to variations in uniform tension applied to both cables.

However, the operation by the pilot of the cockpit control levers (not shown) for changing the direction of flight imposes a greater strain on one or the other of the control cables. This greater tension on one of the control cables is transmitted through the tensioning cable associated therewith to the corresponding side of yoke 30, causing the latter to tilt slightly. In response to this slight rotary motion of the yoke, the complementary helical formations 28 and 29 on the shaft and in the bore of the yoke, respectively, cooperate to shift the yoke laterally, urging the teeth of the movable plate 32 located at the side of the yoke, toward which latter is shifted into locking engagement with the teeth of the adjacent stationary locking plate 22. Due to the small size of the teeth of the respective locking plates and close tolerances of all parts of the locking assembly, only a very slight tilting movement of the yoke is required to engage the lock. Accordingly, with the yoke thus held against movement longitudinally of the device, spring 11 is rendered inoperative, and the directional apparatus is immediately responsive to the slightest re-adjustment of the cockpit controls. It will be noted that the very slight relief of tension applied to one or the other of the control cables incident to tilting of yoke 30 in effecting engagement of the lock is taken up in the other control cable, due to the increase in tension, to a corresponding degree, by the movement of the other ear 36 of the yoke in the opposite direction.

Accordingly, it will be observed that either one or the other pair of locking plates may be engaged whenever the uniformity of the tension applied to the respective control cables is interrupted, and that the lock will be actuated regardless of whether the variation in tension of the respective cables is the result of manipulation of the cockpit controls or from the action of aerodynamic forces on the surfaces of the directional control mechanism itself. Immediately, as a balanced load is restored to the control cables, e. g., when normal flight is resumed, yoke member 30 will again assume a position perpendicular to the longitudinal axis of the compensator, whereupon the pressure of the yoke upon locking plates 32 is relieved, permitting spring 11 to again function to effect a readjustment and to maintain both cables under the predetermined rigged tension.

While the illustrated embodiment is designed particularly for use in aircraft, and the above description contemplates, principally, such use, it will be apparent to those of skill in the art that the unit is by no means limited to this application; that numerous changes in size, design, shape and proportion of the various parts may be made to adapt it for utility in other apparatus of analogous or dissimilar nature—all without departing from the scope of my invention as defined in the appended claims.

What I claim and desire to secure by Letters Patent is:

1. In a device of the character described, a frame, a member movable relative to said frame, and locking means associated with said last-named member to resist said movement between said member and frame, comprising a helical element actuated in response to tension applied to said member and frame.

2. In a device of the character described, a frame, a member movable in said frame having a pair of cable-engaging elements lying in a common plane, parallel to the plane of the cables to be tensioned, a resilient element to urge said member toward one end of its range of movement, and a locking device for preventing the movement between said member and frame aforementioned operable in response to motion of said member in a direction transverse to the plane in which said elements are disposed, relative to the frame.

3. In a device of the character described for tensioning cables, a frame, a member movable in said frame in a direction coinciding with the plane of the cables to be tensioned, and locking means operable to lock said member and frame against relative movement in said direction in response to movement of the member in said frame in a direction transverse to the plane of said cables.

4. In a device of the character described, a frame, a slide operable in said frame, a yoke having a helical bore, a helically formed shaft projecting through the bore of said yoke and secured to said slide, the helical formations of said bore and shaft being effective to shift said yoke laterally incident to pivotal movement of said yoke on said shaft, and locking means interposed between said yoke and said frame actuated in response to lateral motion of said yoke.

5. In a device of the character described, a frame, a yoke assembly, means to guide said yoke assembly in reciprocable movement relative to the frame, said yoke assembly comprising a yoke and means to support said yoke for pivotal movement relative to said frame, means to lock said yoke assembly to prevent said reciprocable movement, and means to shift said yoke laterally in a direction substantially parallel to its pivotal axis in response to pivotal movement of the latter to actuate said locking means.

6. In a device of the character described, a frame, a yoke assembly, means carried by said frame to guide said yoke assembly in reciprocable movement relative to the frame, said yoke assembly comprising slides engaged by said means, a shaft, and a yoke pivoted on said shaft, a stationary serrated locking plate carried by said frame, and a movable serrated locking plate carried by said yoke assembly adjacent said stationary plate, said shaft and yoke having complementary helical formations operable to shift said yoke laterally in response to pivoting of the latter relative to said frame to engage said plates.

7. In a device of the character described, a frame, a pin movable in said frame in a direction transverse to the axis of the pin, a yoke pivoted on said pin and movable with said pin relative to said frame, and locking means to resist movement of said pin in said frame actuated in response to movement of said yoke in a direction substantially parallel to the axis of said pin.

8. In a device of the character described, a frame, a pin movable in said frame in a direction transverse to the axis of the pin, a yoke pivoted on said pin and movable with said pin relative to said frame, and locking means comprising a pair of serrated plates secured to said frame and yoke, respectively, and engageable with one another to lock said pin and frame against movement transverse to the axis of said pin, actuated in response to movement of said yoke in a lateral direction axially of said pin.

9. In a device of the character described, a pair of members relatively movable in directions transverse to one another, and locking means comprising a pair of serrated plates secured to said members and movable therewith respectively, the serrations of said plates being engageable to lock said members against relative movement in one direction in response to movement of said members relative to one another in the other direction.

10. In a device of the character described, a frame, a yoke assembly, means to guide said yoke assembly in reciprocable movement relative to the frame said yoke assembly comprising a yoke and means to pivotally support said yoke for pivotal movement relative to said frame, means to lock said yoke assembly relative to said frame to prevent said reciprocable movement, and means operable in response to the pivoting of the yoke to shift said yoke laterally in a direction substantially parallel to the axis of said pivoting means to actuate said locking means.

11. In a device of the character described for tensioning cables, a frame, a rocker having cable-engaging ends pivoted and reciprocable within said frame, means to urge said rocker toward one end of said frame, locking means interposed between said frame and rocker to lock the same against reciprocable movement, and means carried by said rocker movable laterally in a direction transverse to the plane of the cables to be tensioned to actuate said locking means.

12. In a device of the character described, a frame, a pin movable in said frame in a direction transverse to the axis of the pin, a yoke pivoted on said pin and movable with said pin relative to said frame, means to shift said yoke laterally in a direction substantially parallel to the axis of said pin, and locking means to resist movement of said pin in said frame actuated in response to said lateral movement of said yoke.

13. In a device of the character described, a frame, a pin movable in said frame in a direction transverse to the axis of the pin, a yoke pivoted on said pin and movable with said pin relative to said frame, and locking means comprising a pair of serrated plates secured to said frame and yoke, respectively, and engageable with one another to lock said pin and frame against movement transverse to axis of said pin, actuated in response to pivotal movement of said yoke.

OSCAR SCHWIMMER.

REFERENCES CITED

The following references are of record in the file of this patent:

UNITED STATES PATENTS

| Number    | Name      | Date          |
|-----------|-----------|---------------|
| 586,587   | Bezer     | July 20, 1897 |
| 1,219,342 | Meyers    | Mar. 13, 1916 |
| 2,280,106 | Sturgess  | Apr. 21, 1942 |
| 2,298,611 | Bruderlin | Oct. 13, 1942 |
| 2,327,021 | Cushman   | Aug. 17, 1943 |